United States Patent [19]

Passavant et al.

[11] 4,075,620

[45] Feb. 21, 1978

[54] VIDEO DISPLAY SYSTEM

[75] Inventors: Francis C. Passavant, West Newton; Richard R. Pease, Hingham, both of Mass.

[73] Assignee: GTE Sylvania Incorporated, Stamford, Conn.

[21] Appl. No.: 681,505

[22] Filed: Apr. 29, 1976

[51] Int. Cl.$^2$ .......... G06K 15/20

[52] U.S. Cl. .......... 340/324 AD; 364/521

[58] Field of Search .......... 340/324 A, 324 AD

[56] References Cited

U.S. PATENT DOCUMENTS

| | | | |
|---|---|---|---|
| 3,624,632 | 11/1971 | Ophir | 340/324 AD |
| 3,750,135 | 7/1973 | Carey et al. | 340/324 AD |
| 3,778,810 | 12/1973 | Hayashi | 340/324 AD |
| 3,849,773 | 11/1974 | Katahira et al. | 340/324 AD |
| 3,967,268 | 6/1976 | Roberts | 340/324 AD |

*Primary Examiner*—David L. Trafton
*Attorney, Agent, or Firm*—David M. Keay

[57] ABSTRACT

Television-type display system for displaying standard and non-standard characters within character locations on a television screen. A refresh memory contains digital code words which either represent a standard character such an an alphanumeric character or designate an address in a pattern memory. The pattern memory contains character image data for producing non-standard characters or symbols of any desired configuration within the confines of a character location on the television screen. The contents of the pattern memory and thus the non-standard characters which can be produced are alterable. The contents of the refresh memory are read out in order. Code words representing a standard character are applied to a ROM character generator which converts the code word to character image data for producing the standard character on the television screen. Code words designating an address in the pattern memory are applied to the pattern memory to cause character image data pertaining to the addressed non-standard character to be read out of the pattern memory for producing the non-standard character on the television screen.

7 Claims, 4 Drawing Figures

VIDEO DISPLAY SYSTEM

BACKGROUND OF THE INVENTION

This invention relates to display systems. More particularly, it is concerned with television-like display systems for producing characters of the dot matrix type.

Display systems of the type for displaying data from a computer on television monitors are well-known. These systems are generally similar and employ a central processing unit in which data processing tasks may be performed or in which data is stored. Data is communicated from the central processing unit selectively to several display stations or terminals through an interface unit. Typically information to be displayed at a display terminal is transmitted from the interface unit to a refresh memory of the display terminal. Each display terminal employs a standard closed circuit television monitor for displaying the data in its refresh memory and may also employ a keyboard to permit an operator at the display terminal to communicate with the central processing unit.

Display systems of this general type typically display information as alphanumeric characters. Digital code words representing alphanumeric characters to be displayed are loaded into storage positions in the refresh memory of a display terminal. Each storage position corresponds to a specific row and column character location on the display surface of the display device. The contents of the storage positions are repeatedly read out of the refresh memory in timed relationship with the sweeping of the raster scanline pattern over the display surface. Each code word read out of the refresh memory together with information identifying the particular line of the number of scanlines required to produce a character are applied to a character generator.

The character generator typically is a read only memory (ROM) which converts the coded information to bits of character image data. These bits are gated into the video stream to the display device where they are displayed as a series of dots forming one line of the image of the character. During each succeeding readout of the storage position during a frame of the raster scanline pattern the code word is again applied to the character generator together with the appropriate scanline information. The character generator produces bits of character image data which are displayed as another series of dots. Thus, the character represented by the code word is produced on the display surface in the location designated by its storage position in the refresh memory.

As is well understood in the display art the technique of using digital code words and ROM character generators greatly reduces the storage capacity required in each refresh memory and also in the central processing unit. Rather than store and transmit an image bit for each dot of a character to be displayed, only a code word of a relatively few bits representing a character is processed throughout the system until it is applied to the character generator. The character generator requires only the code word and information from the timing system on the particular scanline of data to be written in order to generate the video image bits for that scanline.

Systems of this general type have also been used for displaying graphical information in addition to alphanumeric text. Code words representing graphical characters are loaded into the refresh memory in the same manner a code words representing alphanumeric characters. The graphical code words are applied to ROM graphical character generators similar to the alphanumeric character generators to generate the video image bits for writing the graphical character. Systems for displaying both alphanumeric and graphical characters are described in U.S. Pat. No. 3,781,850 entitled "Television Type Display System for Displaying Information in the Form of Curves or Graphs" which issued Dec. 25, 1973, to Francis A. Gicca, Francis C. Passavant, and Allen J. Worters, and U.S. Pat. No. 3,778,811 entitled "Display System with Graphic Fill-In" which issued Dec. 11, 1973, to Francis A. Gicca, Francis C. Passavant, William W. Stebbins, and Alan J. Worters.

Under certain conditions it is necessary to display information other than in the form of standard alphanumeric and graphical characters. For example, it may be necessary to display the characters of an alphabet other than the Latin alphabet or to display pictorial or schematic symbols. Known types of display systems employing refresh memories and ROM character generators, however, are limited to displaying only the standard characters provided by the code word format and the character generators employed in the system.

SUMMARY OF THE INVENTION

Display apparatus in accordance with the present invention is capable of displaying standard alphanumeric and graphical characters and also non-standard character or symbols of any configuration. Apparatus in accordance with the present invention employs a display means of the type which produces images on a display surface by selectively writing on the display surface while repeatedly sweeping a raster scanline pattern over the display surface. A first memory is capable of storing a digital code word in each of a plurality of storage positions. Each storage position in the first memory means corresponds to a location on the display surace of the display means. A second memory means is capable of storing character image data in a plurality of storage positions. Each of the digital code words which is stored in the first memory means is either a character code word representing a standard character which is to be displayed or is an address code word designating storage positions in the second memory means. The character image data in the second memory means pertains to non-standard characters.

A first memory readout means reads out digital code words from the first memory means. If a digital code word read out of the first memory means is an address code word, a second memory readout means, which is coupled to the first memory means, reads out character image data from storage positions in the second memory means designated by the address code word. A character data generating means is also coupled to the first memory means, and if a digital code word read out of the first memory means is a character code word, the character data generating means generates character image data pertaining to the standard character represented by the character code word.

The apparatus also includes output means coupled to the character data generating means, to the second memory means, and to the display means. The output means includes character data selection means for selecting the character image data, which pertains to a standard character, from the character data generating means in response to a character code word being read out of the first memory means and selects the character image data, which pertains to a non-standard character, from the second memory means in response to an address code word being read out of the first memory means. The output means causes the display means to write the selected character image data on the display surface at the location on the display surface corresponding to the storage position of the digital code word in the first memory means. Thus, either standard character image data from the character data generating means or non-standard character image data from the second memory means is written in the appropriate location on the display surface of the display device.

BRIEF DESCRIPTION OF THE DRAWINGS

Additional objects, features, and advantages of display apparatus in accordance with the present invention will be apparent from the following detailed discussion together with the accompanying drawings wherein.

DETAILED DESCRIPTION OF THE INVENTION

Figure 1:
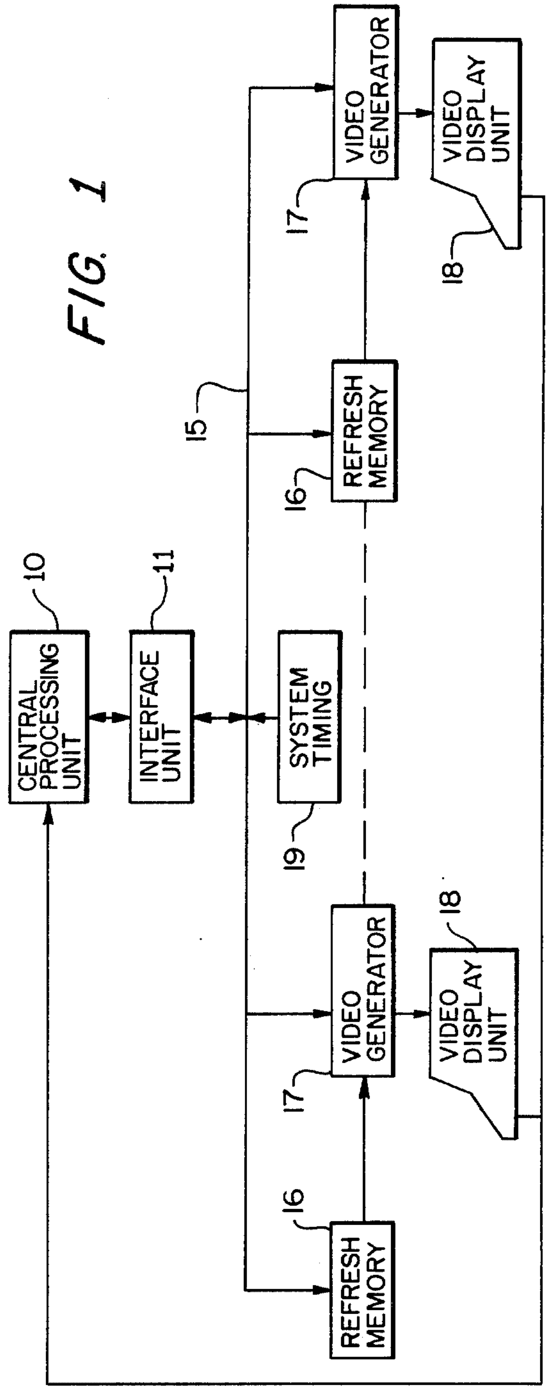
FIG. 1 is a block diagram of a display system of the type which may employ the present invention.

FIG. 1 is a block diagram of an entire display system which at the level of detail shown resembles many known systems as well as systems in accordance with the present invention. The system includes a central processing unit 10 which employs a host computer together with associated peripheral equipment and software. These items do not constitute part of the present invention. The central processing unit communicates with a plurality of identical display terminals through interface unit 11. The system may contain several display terminals each including a refresh memory 16, a video generator 17, and a video display unit 18 which includes a display monitor and a keyboard. Information for display is transmitted to the refresh memory 16 and to the video generator 17 of each display terminal by way of the interface unit 11. The entire system including the refresh memories 16, video generators 17, and the interface unit 11 are controlled by the system timing 19. The interface unit 11 and system timing 19 are connected to the refresh memories 16 and video generators 17 of the display terminals through a video bus 15. The keyboards at the individual display terminals are connected to the central processing unit 10.

Figure 2:
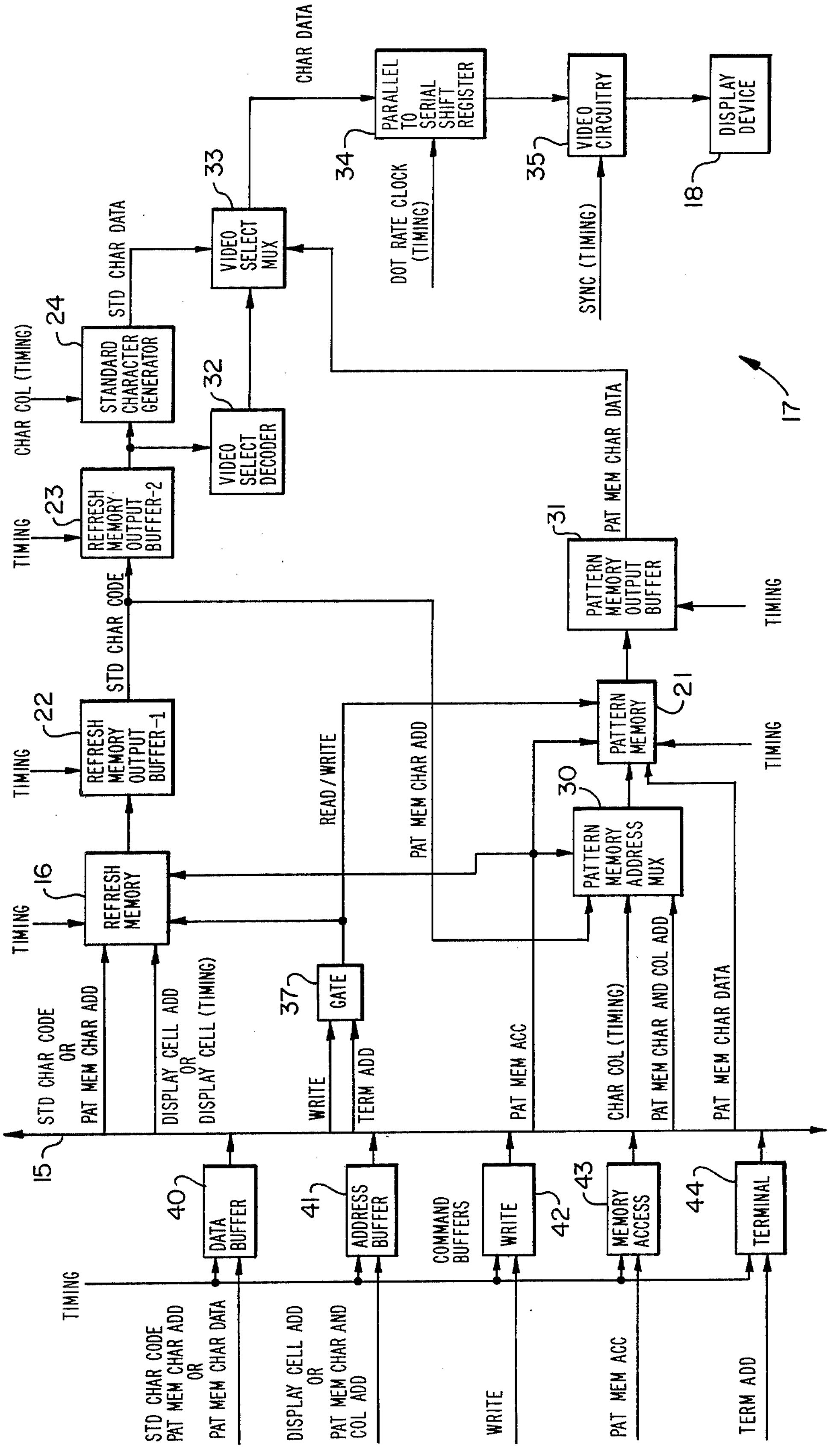
FIG. 2 is a block diagram of a display terminal and certain portions of an interface unit in accordance with the present invention which may be employed in the apparatus of FIG. 1.

A display terminal including a refresh memory 16, video generator 17, and display device 18 and the output buffers of the interface unit 11 are illustrated in detail in FIG. 2. The refresh memory 16 contains an array of storage positions each corresponding to a location within a row and column arrangement on the display surface of the display device 18. Each storage position is capable of storing a single digital code word which may be either a character code word representing a standard character or an address code word designating a memory address as will be explained hereinbelow. The storage positions of the refresh memory are read out in order in timed relation with the sweeping of the raster scanline pattern across the display surface as is well known in television display systems of this general type.

The video generator 17 includes a pattern memory 21 capable of storing character image data for a library of non-standard characters. The data may be changed as will be explained hereinbelow to alter the non-standard characters available for display. The pattern memory must store an image bit for each dot of each character rather than merely the few bits of a character code word representing a standard character. Each set of storage positions in the pattern memory containing all the character image data pertaining to a non-standard character is designated by an address code word which may be stored in a storage position of the refresh memory 16.

When a digital code word is read out of a storage position in the refresh memory 16, it is placed in a refresh memory output buffer-1 22. As stated previously the digital code word is either a character code word representing a standard character or an address code word designating storage positions in the pattern memory. A standard character code word is placed in a refresh memory output buffer-2 23 and subsequently applied to a standard character generator 24. The standard character generator is a read only memory (ROM) of the well-known type which is employed to convert digital character code words together with scanline information from the system timing to the appropriate bits for producing the dot images for the particular scanline of the character.

An address code word read out of the refresh memory 16 is also placed in the refresh memory output buffer-1 22. The address code word is applied through a pattern memory address multiplexer 30 to the pattern memory 21. The address code word addresses storage positons containing all the character image data pertaining to a particular non-standard character. This code word together with the scanline information from the system timing causes the appropriate bits for providing the dot images for the particular scanline of the character to be read out of the pattern memory 21. This character image data is placed in the pattern memory output buffer 31.

Each character code word includes video select bits which are decoded by a video select decoder 32 to determine if the digital code word in the refresh memory output buffer-2 23 is a character code word or is an address code word. In either case an appropriate indication is applied to a video select multiplexer 33. The output of both the standard character generator 24 and the pattern memory output buffer 31 are applied to the video select multiplexer 33. If the video select decoder 32 indicates that a character code word is present in the refresh memory output buffer-2 23, the video select multiplexer 33 passes the standard character image data from the standard character generator 24. If the video select decoder 32 indicates that other than a character code word (that is, an address code word) is present in the refresh memory output buffer-2 23, the video select multiplexer 33 passes the non-standard character image data from the pattern memory output buffer 31. The selected character image data from the video select multiplexer 33 is applied to a parallel-to-serial shift register 34. The character image data is read out at the dot rate for the tracing of the scanline and the resulting video bit stream is applied to video circuitry 35 where it is processed in known fashion and then displayed on the display surface of the display device 18.

When the information being displayed is to be changed, the contents of the refresh memory 16 are replaced with appropriate digital code words from the central processing unit 10. Depending upon the non-standard characters to be used in the display, the contents of the pattern memory 21 may also be altered. Data and address information for the data are applied to the refresh memory 16 and the pattern memory 21 by way of the interface unit. The interface unit includes a data buffer 40 as shown in FIG. 2 in which a digital code word (either a standard character code word or an address code word) for the refresh memory 16 or character image data for the pattern memory 21 is placed. Address information designating the storage positions in the refresh memory 16 or the pattern memory 21 into which the data in the data buffer 40 is to be stored is placed in an address buffer 41. Signals are placed in command buffers 42, 43, and 44 for causing the memories to write in received data, for enabling the proper memory, and for enabling only one of the several display terminals of the system, respectively.

If the data in the data buffer 40 is a standard character code word or an address code word, during a signal from the write command buffer 42, while a signal from the memory access command buffer 43 enables the refresh memory 16 and inhibits the pattern memory 21, the data in the data buffer 40 is written into the refresh memory 16 of the display terminal designated by the signal from the terminal command buffer 44 at the storage positions designated by the address information in the address buffer 41. If the data in the data buffer 40 is non-standard character image data, during a signal from the write comman buffer 42, while a signal from the memory access command buffer 43 enables the pattern memory 21 and inhibits the refresh memory 16, the data in the data buffer 40 is written into the pattern memory 21 of the display terminal designated by the signal from the terminal command buffer 44 at the storage positions designated by the address information in the address buffer 41.

In the specific embodiment of the apparatus as described herein the display surface of the display device 18 is divided into 1500 display cells or character locations arranged in an array of 50 vertical columns by 30 horizontal rows. Each display cell consists of a dot matrix of 9 dots horizontally by 15 dots vertically. A single character whether standard or non-standard is written within a single display cell or character location. The individual scanlines of the raster scanline pattern are swept vertically from the top to the bottom of the display surface. Alternate scanlines are traced during the two consecutive fields of a complete frame or video cycle.

As is well-known in the video display art the timing signals required to operate and control the display apparatus are repeated for each video cycle. In the specific embodiment under discussion the origin of the timing signals is a 35.91 MHz oscillator in the system timing 19. The output of the approximately 36 MHz oscillator is divided by four to produce a 9MHz signal. The 9 MHz signal is the basic dot rate signal and has a period of 111.4 nanoseconds. Since there are 15 vertical dots in each column of a display cell the period for each scanline to trace through a cell is 1.67 microseconds for a cell rate of 600 KHz. Although only 30 cells are utilized on the display surface in the vertical direction, the 600 KHz is divided by 38 to provide a scanline rate of 15.75 KHz. There are 262½ scanlines per field and two fields per frame to provide a field rate of 60 Hz and a frame rate of 30 Hz. In addition to the 35.91 MHz oscillator the system timing 19 also employs counters, dividers, decoders, and other standard logic components arranged in a straightforward manner to provide all the timing signals necessary for controlling each operating cycle of the apparatus.

Figure 3:
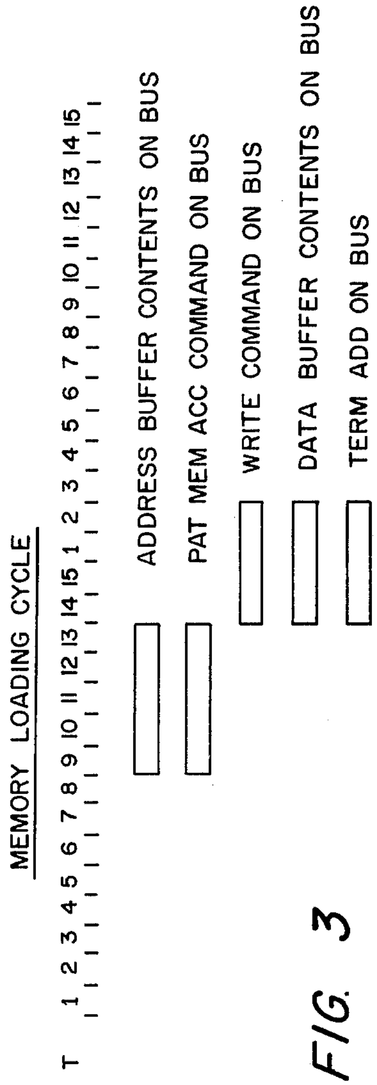
FIG. 3 is a timing diagram of a memory loading cycle of the apparatus.
Figure 4:
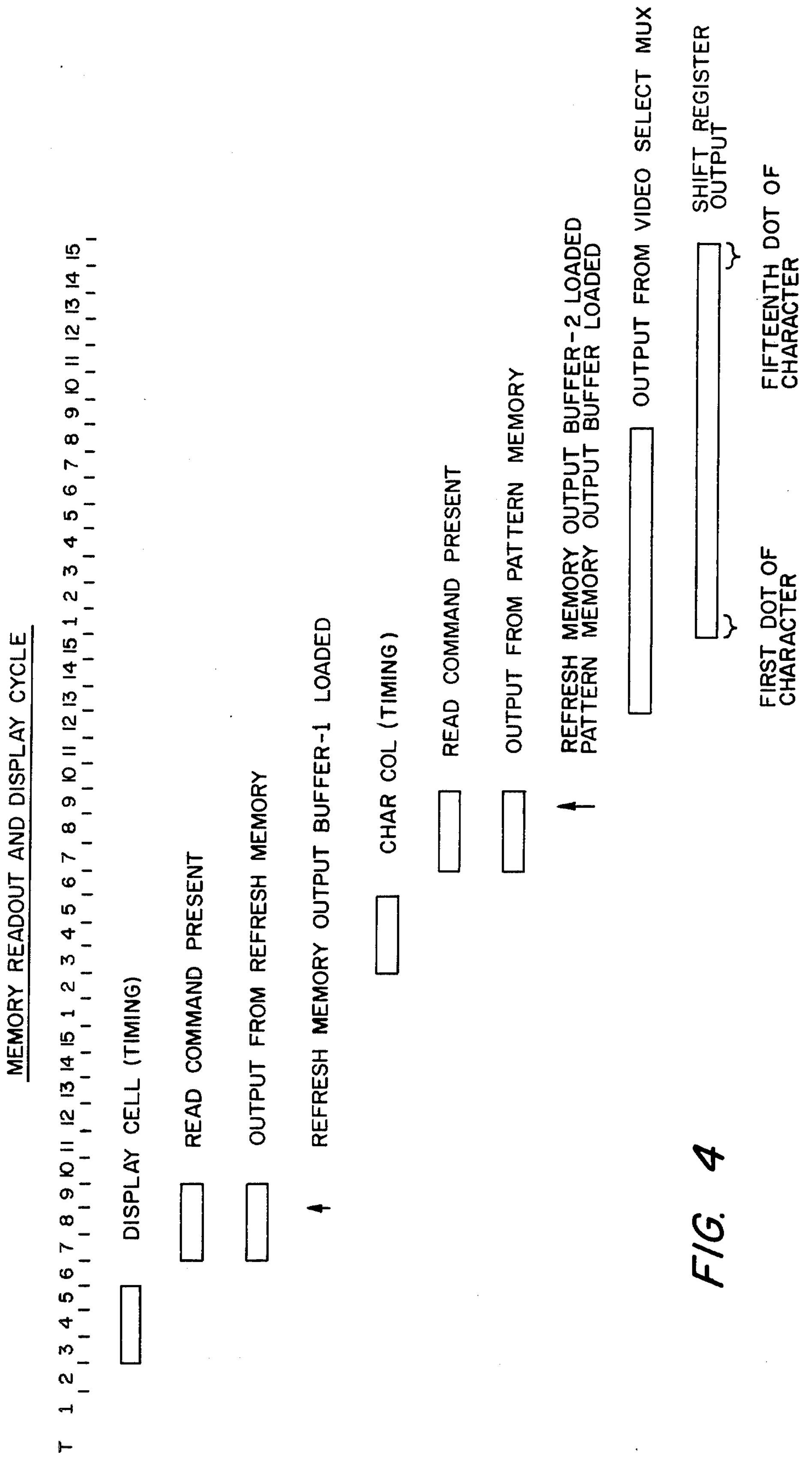
FIG. 4 is a timing diagram of a memory readout and display cycle of the apparatus.

The timing diagrams of FIGS. 3 and 4 are helpful in understanding a more detailed explanation of the operation of the apparatus illustrated in FIG. 2. FIG. 3 is a diagram of a memory loading cycle during which information placed in the output buffers 40 through 44 of the interface unit by the central processing unit is transferred into the proper memory of a particular display terminal. Each of the periods T as shown in FIG. 3 is the period for tracing a single dot on the display surface of the display device (111.4 nanoseconds). Fifteen of the T periods is the period of tracing a scanline to the 15 dots of a display cell (1.67 microseconds). Only a single memory loading cycle is shown in FIG. 3, but the cycle may be repeated at the display cell rate of 15 T periods.

Information is placed in the respective buffers 40 through 44 of the interface unit by the central processing unit during the appropriate times of a memory loading cycle which do not interfere with the transmission of the information over the video bus 15. If the information to be transmitted to a display terminal relates to a standard character, a character code word STD CHAR CODE is placed in the data buffer 40. Similarly, if the information is an address code word designating an address in the pattern memory 21, the address code word PAT MEM CHAR ADD is placed in the data buffer 40. The refresh memory 16 address DISPLAY CELL ADD for the code word in the data buffer 40 is placed in the address buffer 41. A WRITE command is placed in command buffer 42, and a PAT MEM ACC signal indicating that the refresh memory 16 and not the pattern memory 21 is to be accessed is placed in command buffer 43. The address designating the particular display terminal TERM ADD is placed in command buffer 44.

If the information to be transmitted relates to a non-standard character, character image data for a single character dot column (the data written during a single scanline) PAT MEM CHAR DATA is placed in the data buffer 40. The address for that data in the pattern memory 21, which must be designated by character and scanline or column of the character, PAT MEM CHAR AND COL ADD is placed in the address buffer 41. A WRITE command is placed in command buffer 42 and a PAT MEM ACC signal indicating that the pattern memory 21 and not the refresh memory 16 is to be accessed is placed in command buffer 43. The address of the particular display terminal TERM ADD is placed in command buffer 44.

As illustrated in FIG. 3 the contents of the address buffer 41 and pattern memory access buffer 43 are placed on the video bus 15 in parallel during periods T9 through T13. If the address information is a DISPLAY CELL ADD signal, an appropriate PAT MEM ACC signal enables the refresh memories 16 and inhibits the pattern memories 21. If the address information is a PAT MEM CHAR AND COL ADD signal, an appropriate PAT MEM ACC signal enables the pattern memories 21 and inhibits the refresh memories 16. In addition, the PAT MEM ACC signal causes the pattern memory address multiplexer 30 to pass the PAT MEM CHAR AND COL ADD signal to the pattern memories 21. In response to a clock pulse during periods T9 through T13 the enabled refresh memories 16 or the enabled pattern memories 21 are loaded with a DISPLAY CELL ADD signal or a PAT MEM CHAR AND COL ADD signal, respectively, from the address buffer 41.

During periods T14 through T2 the WRITE command in command buffer 42, the data STD CHAR CODE, PAT MEM CHAR ADD, or PAT MEM CHAR DATA in the data buffer 40, and the display terminal address TERM ADD in command buffer 44 are placed on the video bus 15. The TERM ADD and WRITE signals are applied to a gate 37 in each of the display terminals. The gate 37 of a display terminal permits the WRITE signal to pass only if the TERM ADD signal designating that display terminal is received. Thus a WRITE signal is applied to the refresh memory 16 and pattern memory 21 of only a single display terminal. The data in the data buffer 40 is written in the enabled memory at the address previously loaded into that memory in response to a clock pulse within the periods T14 through T2. If the data is a character code word STD CHAR CODE or an address code word PAT MEM CHAR ADD, it is written into the refresh memory 16 at the storage position designated by the address information DISPLAY CELL ADD. If the data is non-standard character data PAT MEM CHAR DATA, it is written into the pattern memory 21 at the storage positions designated by the address information PAT MEM CHAR AND COL ADD.

Only a single memory loading cycle is illustrated in FIG. 3. The cycle may occur at the cell rate whenever display information is placed in the interface buffers 40 through 44 by the central processing unit for any display terminal. Thus, one digital code word may be entered in any one of the refresh memories of the system or the character image data for one dot column of a non-standard character may be entered in any one of the pattern memories of the system during each display period of 1.67 microseconds.

FIG. 4 is a timing diagram illustrating a memory readout and display cycle during which a single digital code word is read out of a refresh memory 16, the code word is processed by the video generator 17 to produce image data and the character image data is applied to the display device 18. The various operations for memory readout and display are repeated at the display cell rate of 600 KHz (every 1.67 microseconds). However, a complete cycle involving a digital code word and the display of its corresponding character image data extends over a period of about three display cell periods. Only a single cycle pertaining to a single code word is shown in FIG. 4. This cycle occurs simultaneously in each display terminal of the system under control of timing signals from the system timing 19.

As is well understood the storage positions of the refresh memory 16 are read out in order and in fixed time relationship with the tracing of a scanline through the corresponding locations or display cells on the display surface. During the period T3 through T5 as shown in FIG. 4 the system timing produces a storage position or display cell address DISPLAY CELL (TIMING) designating a storage position in the refresh memory 16. This address information is clocked into the refresh memory on a clock pulse within the period T3 through T5. As indicated by FIG. 4 a READ command is applied to the refresh memory 16 during the period T7 through T9 (actually a READ command is continually applied to both the refresh memory 16 and pattern memory 21 except during a WRITE command from the command buffer 42 applied to the display terminal by way of its gate 37). As indicated in FIG. 4 the digital code word to be read out of the refresh memory is present at its output during the period T7 through T9. As explained previously this output is either a STD CHAR CODE signal representing a particular standard character having its character image data in the standard character generator 24 or a PAT MEM CHAR ADD signal designating storage positions containing non-standard character image data in the pattern memory 21. In either event the output is loaded in parallel into the refresh memory output buffer-1 22 by a clock pulse at the T9 period.

In the specific embodiment under discussion the code word in the refresh memory output buffer-1 22 is processed by the refresh memory output buffer-2 23 and standard character generator 24 as if it were a standard character code word STD CHAR CODE and at the same time the code word is processed by the pattern memory 21 and pattern memory output buffer 31 as if it were an address code word PAT MEM CHAR ADD. Only the proper character image data is selected for display by the video select decoder 32 and video select multiplexer 33.

The output of the refresh memory output buffer-1 22 is applied in parallel to the pattern memory address multiplexer 30. A signal CHAR COL (TIMING) from the system timing which in present during the periods T3 through T5 indicates the particular one of the nine scanlines or character dot columns of the character which is being traced. These two items of address information identify storage positions in the pattern memory 21 containing character image data for one of nine columns of a non-standard character. Since there is no signal from the memory access command buffer 43 enabling the refresh memory 16 and inhibiting the pattern memory 21, the pattern memory address multiplexer 30 is activated to pass the PAT MEM CHAR ADD and CHAR COL (TIMING) signals to the pattern memory 21. This address information is loaded into the pattern memory 21 on a clock pulse within the period T3 through T5.

As explained previously a READ signal is present except when a WRITE signal is being received from the command buffer 43 by way of the gate 37. Thus, a READ signal is present during the periods T7 through T9 and the character image data DAT MEM CHAR DATA is available at its output as shown in FIG. 4. A clock pulse at the T9 period loads the output of the pattern memory 21 into the pattern memory output buffer 31 in parallel. On the same clock pulse the contents of the refresh memory output buffer-1 22 is loaded in parallel into the refresh memory output buffer-2 23. The output of the refresh memory output buffer memory-2 23 is applied in parallel to the standard character generator 24. This code word together with the CHAR COL (TIMING) signal indicating the particular dot column of the character causes the data character generator 24 to produce a set of character image data bits STD CHAR DATA in parallel.

As explained previously only one of the sets of character image data STD CHAR DATA from the standard character generator 24 or PAT MEM CHAR DATA from the pattern memory output buffer 31 is proper valid data. The code word read out of the refresh memory 16 contains video select bits which identifies it as a character code word STD CHAR CODE or as an address code word PAT MEM CHAR ADD. While the code word is in the refresh memory output buffer-2 23, the video select bits are decoded by the video select decoder 32. If the video select decoder 32 determines that a STD CHAR CODE word is present, it produces a signal causing the video select multiplexer 33 to pass the STD CAR DATA bits from the standard character generator 24. If the video select decoder 32 determines that a PAT MEM CHAR ADD word is present, it produces another signal causing the video select multiplexer 33 to pass the PAT MEM CHAR DATA bits from the pattern memory output buffer 31.

The selected character image data bits CHAR DATA are passed by the video select multiplexer 33 in parallel to the parallel-to-serial shift register 34. As indicated in FIG. 4 the character image data appears at the output of the video select multiplexer 33 from approximately period T13 until the output buffers are again clocked at T9. The output of the video select multiplexer 33 is clocked into the shift register 34 at the T1 period. The bits are clocked out of the shift register in series at the dot clock rate, or one bit during each T period.

The video bit stream output of the shift register 34 is applied to video circuitry 35 which also receives synchronizing signals SYNC (TIMING) from the system timing. The resulting composite video signal is applied to the display device 18 and the character image data is written on the display surface as a column of dots within the fifteen dot spaces of the display cell or character location. As explained previously the operations of the memory readout and display cycle are repeated every display cell period in timed relation with the tracing of a scanline through the character locations on the display surface.

Thus, the apparatus as disclosed utilizes digital character code words and a ROM character generator in the usual well-known manner to display standard characters. In addition, the apparatus utilizes address code words and an alterable pattern memory thereby providing for the display of non-standard characters of any configuration.

While there has been shown and described what is considered a preferred embodiment of the present invention, it will be obvious to those skilled in the art that various changes and modifications may be made therein without departing from the invention as defined by the appended claims.

What is claimed is:

1. Apparatus for displaying characters including in combination display means capable of producing images on a display surface by selectively writing on the display surface while repeatedly sweeping a raster scanline pattern over the display surface;

first memory means for storing digital code words in a plurality of storage positions, each storage position corresponding to a location on the display surface of said display means, and the storage positions being arranged in an array designating the locations on the display surface by first and second orthogonal sets of lines;

second memory means for storing character image data in a plurality of storage positions;

each of said digital code words being a character code word representing a character to be displayed or being an address code word designating storage positions in said second memory means;

data input storage means for receiving and storing a digital code word, or character image data;

address input storage means for receiving and storing display location information designating a storage position in said first memory means associated with a digital code word stored in said data input storage means, or storage position information designating storage positions in said second memory means associated with character image data stored in said data input storage means;

memory access storage means for receiving and storing a first indication when a digital code word is received and stored in said data input storage means and display location information is received and stored in said address input storage means, and for receiving and storing a second indication when character image data is received and stored in said data input storage means and storage position is received and stored in said address input storage means;

said first memory means being operable to receive a digital code word from said data input storage means and the associated display location information from said address input storage means and to store the received digital code word in the storage position designated by the received display location information when enabled by a first indication from said memory access storage means;

said second memory means being operable to receive character image data from said data input storage means and the associated storage position information from said address input storage means and to store the received character image data in the storage positions designated by the storage position information when enabled by a second indication from said memory access storage means;

first memory readout means for reading out digital code words from the storage positions of said first memory means designating locations in a line of the first orthogonal set in sequence for each tracing of a scanline;

second memory readout means coupled to said first memory means for reading out character image data from the storage positions in said second memory means designated by an address code word read out of said first memory means;

character data generating means coupled to said first memory means and operable in response to a character code word being read out of a storage position in the first memory means to generate character image data pertaining to the character represented by the character code word; and output means coupled to the character data generating means, the second memory means, and the display means;

said output means including character data selection means for selecting character image data from the character data generating means in response to a character code word being read out of said first memory means and for selecting character image data from the second memory means in response to an address code word being read out of said first memory means;

said output means being operable to cause the display means to write the selected character image data on the display surface at the location on the display surface corresponding to the storage position of the digital code word in said first memory means.

2. Apparatus for displaying characters in accordance with claim 1 wherein:

said second memory readout means includes input control means for receiving storage position information from said address input storage means and for receiving an address code word from said first memory means;

said input control means being operable to cause the second memory means to store received character image data from said data input storage means in storage positions designated by received storage position information in response to a first control condition being applied thereto;

said input control means being operable to cause the second memory readout means to read out character image data from storage positions in said second memory means designated by a received address code word in response to a second control condition being applied thereto; and means for applying said first control condition to said input control means while storage position information is being received and for applying said second control condition to said input control means while an address code word is being received.

3. Apparatus for displaying characters in accordance with claim 2 wherein said character data selection means includes:

decoding means for providing a first indication in response to a character code word being read out of said first memory means and for producing a second indication in response to an address code word being read out of said first memory means; and gating means for applying character image data from said character data generating means to said display means in response to a first indication from said decoding means and for applying character image data from said second memory means to said display means in response to a second indication from said decoding means.

4. Apparatus for displaying characters in accordance with claim 1 wherein:

each location on the display surface is swept by a number of scanlines of the raster scanline pattern to produce the image of a character at the location; and including:

timing means for producing a signal designating the particular scanline of said number of scanlines in fixed time relationship with the tracing of the scanline on the display surface;

said first memory readout means being operable to read out a code word from a storage position in said first memory means during the period of tracing a scanline through a location on the display surface;

said second memory readout means being operable to read out character image data from storage positions in said second memory means designated by an address code word read out of said first memory means and pertaining to the particular scanline of said number of scanlines as designated by the signal from the timing means during the period of tracing a scanline through a location on the display surface;

said character data generating means being operable in response to a character code word being read out of a storage position in the first memory means and a signal from said timing means to generate character image data for the character represented by the digital character code word and pertaining to the particular scanline as designated by the signal from the timing means; and said output means being operable to cause the display means to write the character image data selected by the character data selection means on the display surface while tracing the particular scanline through the location on the display surface corresponding to the storage position of the digital code word in said first memory means read out by the first memory readout means.

5. Apparatus for displaying characters in accordance with claim 4 wherein:

said first memory means is operable to receive a digital code word from said data input storage means and the associated display location information from said address input storage means and to store the received digital code word in the storage position designated by the received display location information during the period of tracing a scanline through a location on the display surface; and said second memory means is operable to receive character image data pertaining to a particular scanline of the number of scanlines of a character from said data input storage means and the associated storage position information from said address input storage means and to store the received character image data in the storage positions designated by the storage position information during the period of tracing a scanline through a location on the display surface.

6. Apparatus for displaying characters in accordance with claim 5 wherein:

said second memory readout means includes input control means for receiving storage position information from said address input storage means, and for receiving an address code word from said first memory means and a signal from the timing means designating a particular scanline of the number of scanlines of a character;

said input control means being operable to cause the second memory means to store received character image data from said data input storage means in storage positions designated by received storage position information in response to a first control condition being applied thereto;

said input control means being operable to cause the second memory readout means to read out character image data pertaining to a particular scanline from storage positions in said second memory means designated by a received address code word and a received signal designating a particular scanline in response to a second control condition being applied thereto; and means for applying said first control condition to said input control means while said storage position information is being received and for applying said second control condition to said input control means while an address code word and a signal designating a particular scanline are being received.

7. Apparatus for displaying characters in accordance with claim 6 wherein said character data selection means includes:

decoding means for providing a first indication in response to a character code word being read out of said first memory means and for producing a second indication in response to an address code word being read out of said first memory means; and gating means for applying character image data from said character data generating means to said display means in response to a first indication from said decoding means and for applying character image data from said second memory means to said display means in response to a second indication from said decoding means.

* * * * *